UNITED STATES PATENT OFFICE.

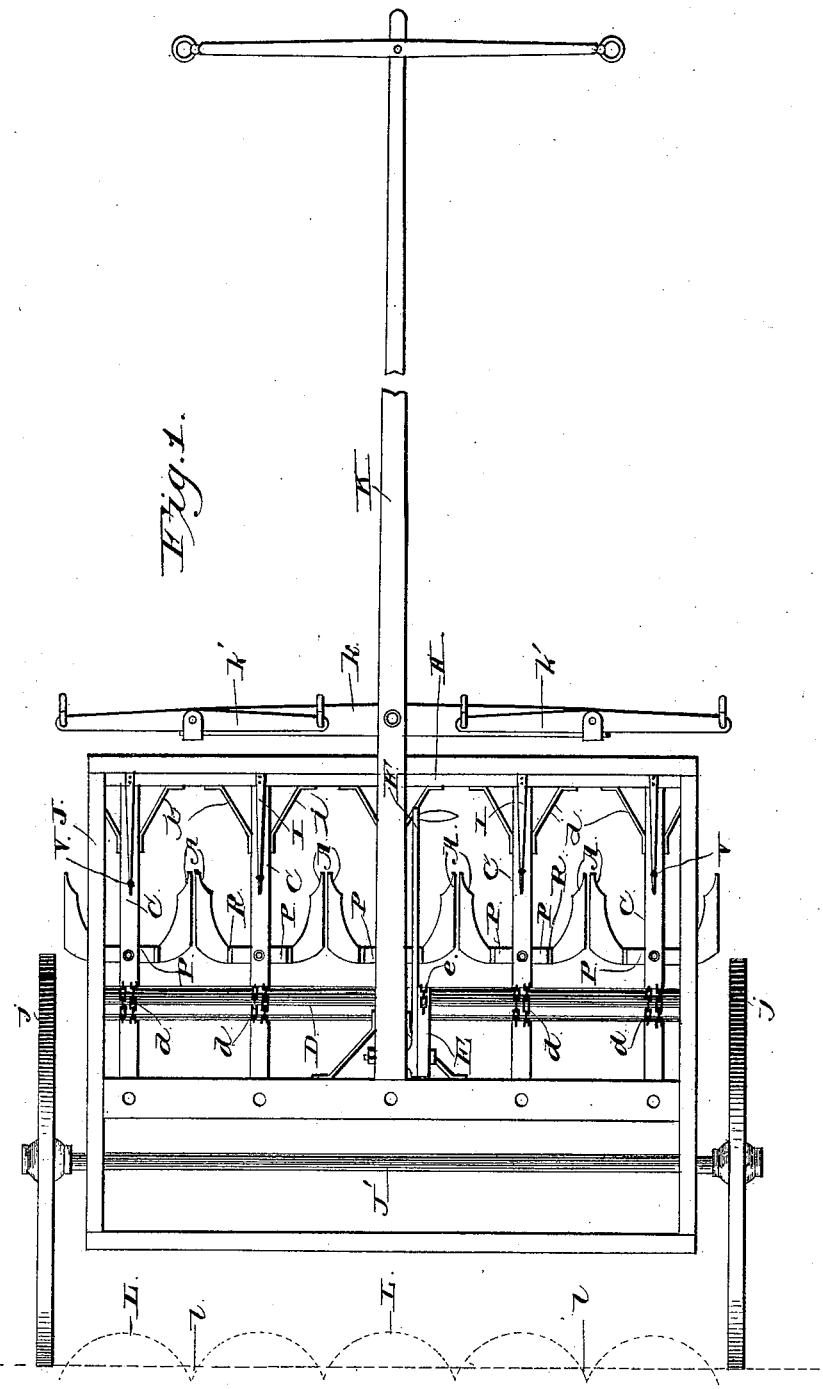

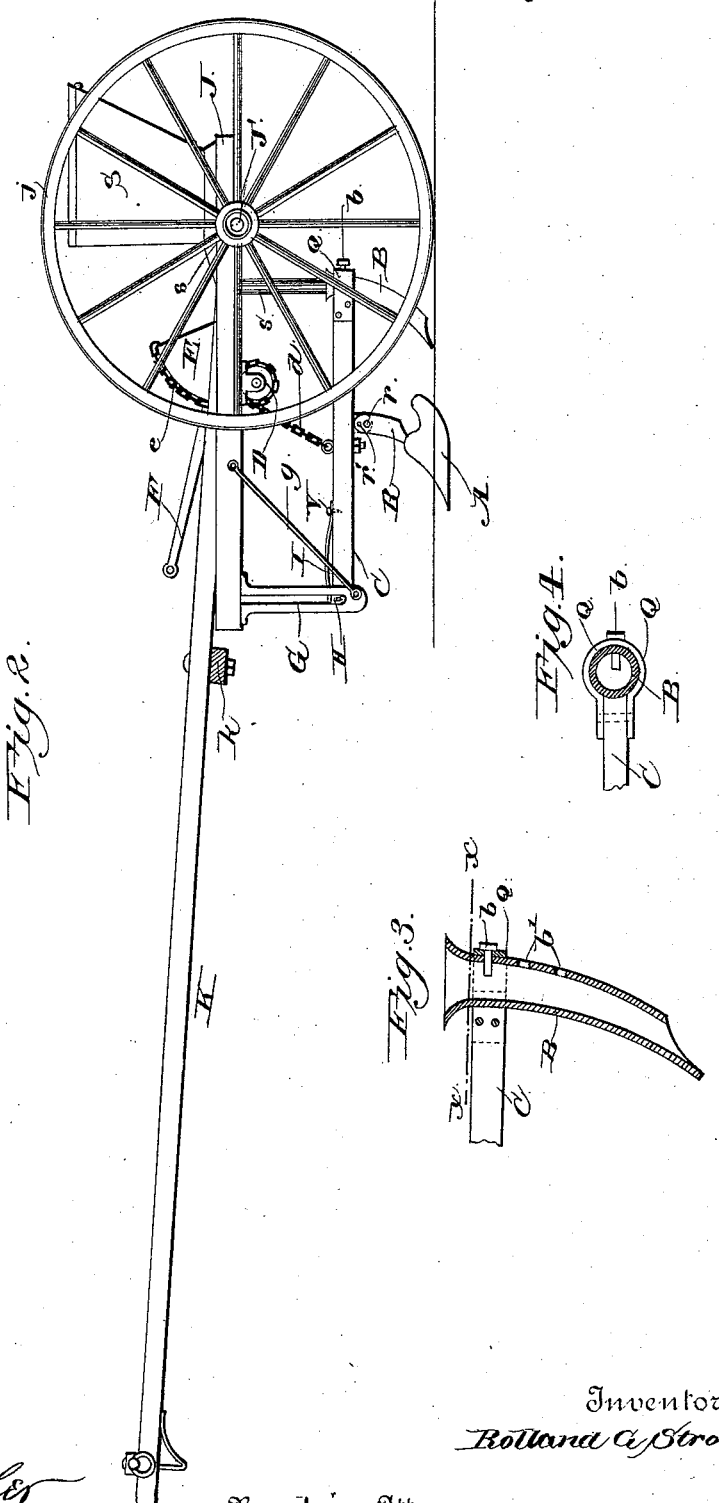

ROLLAND G. STROTHER, OF FINDLAY, OHIO.

GRAIN-DRILL.

SPECIFICATION forming part of Letters Patent No. 402,697, dated May 7, 1889.

Application filed August 21, 1888. Serial No. 283,326. (No model.)

*To all whom it may concern:*

Be it known that I, ROLLAND G. STROTHER, a citizen of the United States, residing at Findlay, in the county of Hancock and State of Ohio, have invented a new and useful Improvement in Grain-Drills, of which the following is a specification.

This invention relates to grain-drills; and it has for its object to provide a machine that will throw the ground up in ridges, leaving trough-shaped depressions between the ridges for draining the land, and which will plant the seed in the crest of the ridges, where it will be free from excessive moisture and not liable to be hurt by cold. The seed, being sown in the crest of the ridges, admits of better cultivation than if sown on a level surface. The depressions between the ridges form a complete drainage and prevent an accumulation of water, which so often is the source of a poor crop or no crop at all. The advantage of sowing the seed in the ridges and having depressions or drains on each side of the ridges is manifest, as the ground, being thoroughly drained, will not bake or clog, consequently will remain mellow and permit the roots to spread. The planting may also be done later in the season, and the crop will be protected from the ravages of the fly and from freezing, the latter being evident, as there will be no water to become frozen about the seed and destroy the germs.

The improvement consists in the details of construction and the combination of the parts, which hereinafter will more fully be described and claimed, and shown in the accompanying drawings, in which—

Figure 1 is a top plan view of an agricultural machine embodying my invention, the hopper and the feed mechanism being removed. Fig. 2 is a side view of the machine equipped and adapted for sowing seed. Fig. 3 is a detail sectional view of one of the seed-spouts. Fig. 4 is a sectional view taken on the line $x\ x$ of Fig. 3.

The frame J, supported on the wheels $j$, provided at the ends of the axle J', is drawn over the field by suitable means, as the tongue K and the double and single trees $k$ and $k'$, respectively. The axle is located at the rear end of the frame, and from the front end of the frame depend the slotted brackets G G, which are strengthened by the stays $g$. The cross-bar H, having its ends fitted in the slots of the brackets, is free to move vertically in the said slots of the brackets to regulate the depth of the drains and cultivation. The gang-bars C, secured by hinge-connections to the cross-bar H, are braced laterally by the braces $i$, which have flexible connections with the cross-bar and with the said gang-bars, extend rearwardly in substantially a horizontal plane, and have their rear ends formed or provided with seats for the drill-openers B, which are held thereto by the clip Q. This clip embraces the opener B, which is held adjustably in the clip by the pin $b$, passing through one of a series of openings, $b'$, in the drill-opener. Thus provision is had for adjusting the opener vertically independent of the gang-bars. The gang-bars have short cross-bars P, secured thereto midway of their ends, which bars have their ends bent down at right angles, and are adapted to have the standards R secured thereto by the bolt $r$ and the break-pin $r'$. The standards may be removable and replaced by others having different shovels, or the shovels may be removable from the standards.

Figs. 1 and 2 show the standards R, having plows A, which form the drains, the plows at the ends of a cross-bar being set with their shares opposing, whereby in operation they turn the furrows toward one another to form a ridge, as shown by dotted lines at L, Fig. 1. The adjacent plows of two contiguous cross-bars have their landsides opposite one another to form the depressions or drains $l$ between the ridges L.

The roller D, journaled at its ends in the side bars of the frame, is connected with each of the gang-bars C by independent chains or connections $d$, and is rotated by suitable means, as the segment or cam E, the hand-lever F, and the chain $e$, to effect a winding and unwinding of the chains $d$, for raising and lowering the gang-bars simultaneously.

Fig. 2 shows the implement fitted up for drilling, the grain being carried in the hopper S, and fed to the drill tubes or openers through the grain-spouts.

The drill-shoes are arranged midway of the spaces between the plows of a cross-bar, to sow the seed in the crest of the ridges, where they will be protected from excessive wet or cold.

It will be observed that the cross-bar H is prevented having any rotary movement by having its ends tenoned, and having the tenoned ends fitted in the slots of the brackets G. The gang-bars are held down to their work by the springs I, which are fastened at one end to the cross-bar and at their other end to the gang-bars by eyebolts V. These bars have an independent movement, and are held down by independent yielding forces; hence if one meets with an unyielding substance in its path it can ride over the same, the spring returning the bar to its working position when it has passed over the said obstruction.

Having described my invention, I claim—

1. In a grain-drill, the combination, with the gang-bars and the short cross-bars secured to the gang-bars and having their ends bent down, of the interchangeable shovels secured thereto, substantially as and for the purpose described.

2. The combination, with the frame having slotted brackets, and the cross-bar fitted in the slots of the said brackets, of the gang-bars connected with the cross-bar, the roller having independent connections with the gang-bars, and means for rotating the roller, substantially as described, for the purpose specified.

3. The combination, with the frame, the slotted brackets, and the cross-bar adjustable in the brackets, of the gang-bars connected with the cross-bar by hinge-connections, and the springs secured at one end to the cross-bar and having their opposite ends adapted to exert a pressure on the said gang-bars, substantially as described, for the purpose set forth.

4. The combination, with the frame, the slotted brackets, the cross-bar, and the gang-bars hinged to the cross-bar, of the springs, the roller having independent connections with the gang-bars, and means for rotating the roller, substantially as and for the purpose described.

5. The combination, with the frame, of the vertically-movable cross-bar, and the gang-bars connected to the latter, each of said gang-bars having a cross-bar carrying a pair of plows adapted to form a ridge, and each gang-bar being further provided with a drill arranged for sowing in the crest of the ridge, substantially as set forth.

6. The combination, with the adjustable gang-bar provided with a pair of plows to form a ridge, of the drill-shoe connected with the gang-bar in rear of and intermediately between said plows and having an independent vertical adjustment, substantially as described.

7. The combination, with the gang-bar having a curved recess or semicircular groove formed vertically in its rear end, of the drill-shoe fitted in said recess so as to be vertically movable therein, a clip embracing said shoe and secured to the gang-bar by transverse bolts, and a pin passing longitudinally through the rear side of the clip and through one of a series of perforations in the shoe, which is thereby secured vertically adjustable to the bar, substantially as set forth.

In testimony that I claim the foregoing as my own I have hereto affixed my signature in presence of two witnesses.

ROLLAND G. STROTHER.

Witnesses:
A. ZUGSCHWERT,
PRESLEY E. HAY.